United States Patent
Whitmyer, Jr.

(10) Patent No.: US 6,182,078 B1
(45) Date of Patent: *Jan. 30, 2001

(54) SYSTEM FOR DELIVERING PROFESSIONAL SERVICES OVER THE INTERNET

(76) Inventor: Wesley W. Whitmyer, Jr., 198 Old Kings Hwy., Darien, CT (US) 06820

( * ) Notice: Under 35 U.S.C. 154(b), the term of this patent shall be extended for 0 days.

This patent is subject to a terminal disclaimer.

(21) Appl. No.: 09/453,728

(22) Filed: Dec. 2, 1999

Related U.S. Application Data (63) Continuation of application No. 09/237,521, filed on Jan. 27, 1999, now Pat. No. 6,049,801, which is a continuation-in-part of application No. 08/726,999, filed on Oct. 7, 1996, now Pat. No. 5,895,468.

(51) Int. Cl.[7] ........................................ G06F 17/30
(52) U.S. Cl. ........................ 707/10; 707/501; 707/513; 705/26; 709/217; 709/218
(58) Field of Search .................. 707/1–3, 10, 104, 707/8, 9, 200–203, 501, 513; 709/201–203, 217–219; 705/26

(56) References Cited

U.S. PATENT DOCUMENTS

| | | | |
|---|---|---|---|
| 4,807,154 | 2/1989 | Scully et al. | 345/329 |
| 5,329,447 | 7/1994 | Leedom, Jr. | 705/9 |
| 5,410,646 | 4/1995 | Tondevold et al. | 707/507 |
| 5,530,852 | 6/1996 | Meske, Jr. et al. | 395/200.36 |
| 5,548,506 | 8/1996 | Srinivasan | 395/200.36 |
| 5,548,753 | 8/1996 | Linstead et al. | 707/1 |
| 5,592,664 | 1/1997 | Starkey | 707/1 |
| 5,659,729 | 8/1997 | Nielsen | 707/3 |
| 5,664,063 | 9/1997 | Johnson et al. | 395/10 |
| 5,664,714 | 9/1997 | Kikinis | 395/200.49 |
| 5,758,328 | 5/1998 | Giovannoli | 705/26 |
| 5,850,520 | 12/1998 | Griebenow | 709/206 |
| 5,870,745 | 2/1999 | McCune | 707/10 |
| 5,895,468 | 4/1999 | Whitmyer, Jr. | 707/10 |
| 5,907,837 | 5/1999 | Ferrel et al. | 707/3 |
| 6,049,801 | * 4/2000 | Whitmyer, Jr. | 707/10 |

OTHER PUBLICATIONS

"YEAST: A General Purpose Event–Action System," Krishnamurthy et al. IEEE /Transaction on Software Engineering, vol. 21m No., 10, pp. 845–857, Oct., 1995.

"An Internet Difference Engine and its Applications" Ball et al., Proceedings of the 1996 Forty–First IEEE Computer Society International Conference, pp. 71–76, Feb. 1996.

"Internet Access: Aspect Interactive Web", Edge, on & about AT & T, v11 , p14(1), Dialog file 275 at DialogWeb: http//www.dialogweb.com/cgi/dwclient Date unknown.

"No need to open Windows to track changes on Web", MacWEEK, v9, n45, p30(1), Dialog File 275 at DialogWeb: //www.dialogweb.com/cgi/dw client Date unknown.

* cited by examiner

Primary Examiner—Hosain T. Alam
(74) Attorney, Agent, or Firm—St. Onge Steward Johnston & Reens LLC (57) ABSTRACT

A system is provided to deliver professional services over the Internet. The system includes a computer, a database of client reminders, and software for automatically querying the database by values attributed to date fields to select reminders. The software also automatically generates a form based on the retrieved client reminder and transmits it to the client over the Internet. The system may include or comprise a web site.

11 Claims, 7 Drawing Sheets

SYSTEM FOR DELIVERING PROFESSIONAL SERVICES OVER THE INTERNET

This application is a continuation of U.S. patent application Ser. No. 09/237,521 filed Jan. 27, 1999, now U.S. Pat. No. 6,049,801 which is itself a continuation-in-part of U.S. patent application Ser. No. 08/726,999, filed Oct. 7, 1996, now U.S. Pat. No. 5,895,468 issued Apr. 20, 1999.

FIELD OF THE INVENTION

The invention relates to a system for delivering professional services over the Internet.

BACKGROUND OF THE INVENTION

Many functions performed by attorneys and other professionals involve a series of deadlines. For example, oftentimes an attorney must send a client a reminder, obtain authorization or possibly executed documents from the client, and then take some action based on the client's response. Each of these actions must be performed in a timely manner, as clients may be required to pay enormous late fees, or may even lose rights altogether, due to a missed deadline. Moreover, these functions are often time-intensive, costly, and tedious, with professionals spending countless hours attempting to contact busy clients by telephone or by writing multiple letters attempting to elicit a response from the client. These problems are compounded by the fact that the typical professional has many clients, each client having many matters which the professional must constantly monitor.

Several systems have been developed for facilitating some of the functions which professionals must perform. Perhaps the most common of such systems is the standard docketing system, which typically contains a database of deadlines. The docketing system notifies the professional of each upcoming deadline a preset time period before the deadline by printout, attached terminal, or networked computer.

A disadvantage of docketing systems, however, is that such systems aid in only one of many steps which the professional must perform, that step being examining a calendar periodically to notice upcoming deadlines. Even using a docketing system, the professional must still contact the client initially and send multiple reminders if necessary, wait for the client to make a decision and respond with an authorization, compose a letter or perform some other action based on the client's response, send a confirmation of the action taken to the client, and manually update the docketing system or instruct someone else to do the same. Each of the steps taken by the professional is often time-intensive and expensive. For example, corresponding by telefax, telephone, or express mail at each step of the process, often with parties in foreign countries, involves great expense, as does the time required to compose and send telefaxes, letters, and reminders, telephone clients or other necessary third parties, and manually update the docketing system.

Another disadvantage of docketing systems is that the system does not employ modern computer communications media, such as the Internet. Today's sophisticated clients are more apt to use, and often desire to use, new technologies for communication. These technologies greatly decrease the costs and increase the timeliness of communication, as evidenced by the low expense associated with Internet usage. Communication using the Internet is far less expensive and/or more timely than traditional communication using telephone, telefax, or express mail, which are the communication methods currently being employed by professionals. This is especially true of today's worldwide businesses which require communication with parties in many foreign countries. Moreover, using modern communication technology, the professional may transfer in seconds a clean, original document so that the client may simply print the document, execute it, and mail it back to the professional, thereby halving the time required to obtain signed originals.

In one currently prevailing business model, the professional firm or service bureau maintains a docket database on behalf of a client or clients. A disadvantage of this approach is that the client does not have direct access over his/its data.

In another current approach, typically used by large corporations, the client has direct access and control over his/its data, but also must take responsibility for its security and accuracy, by maintaining hardware and software, and by proofing and reviewing the data as well as changes, e.g. in dates, fees and the like due to changes in the law of foreign jurisdictions.

What is desired, therefore, is an automated system for obtaining authorizations from clients prior to deadlines which will improve the speed, efficiency, and reliability of performing professional services for clients. Providing a system in which communications between the professional and the client take place over the Internet is also desired, as is a system which automatically acts on the authorization to perform or prepare the documents necessary to perform the professional service desired by the client. An automated system which provides clients with control over, but not responsibility for the data is also desired.

SUMMARY OF THE INVENTION

Accordingly, it is an object of the invention to provide a device and method for use by professionals which improves the speed, efficiency, and reliability of performing services for clients.

Another object of the invention is to provide a device and method of the above character which automatically prepares reminders and solicits replies for client due dates.

A further object of the invention is to provide a device and method of the above character which transmits reminders and receives replies over the Internet.

Yet another object of the invention is to provide a device and method of the above character which automatically acts on the client's authorization to perform or prepare the documents necessary to perform the professional service desired by the client.

Still a further object of the invention is to provide a device and method of the above character which automatically composes and sends a confirmation of the service performed to the client.

Still yet another object of the invention is to provide a web site permitting clients direct access to the docket database used to automate providing of professional services on their behalf.

These and other objects of the invention are achieved by provision of a device for automatically delivering professional services to a client. The device includes a computer and a database containing a plurality of client reminders. The device also includes software executing on the computer for automatically querying the database by date to retrieve a client reminder, for automatically generating a form based on the retrieved client reminder, and for automatically transmitting the form to the client through a communication link between the computer and the Internet.

In another aspect, the invention comprises a method of operating the computer and the device for automating delivery of professional services to a client.

The invention and its particular features and advantages will become more apparent from the following detailed description considered with reference to the accompanying drawings.

DETAILED DESCRIPTION OF THE INVENTION

Figure 1:
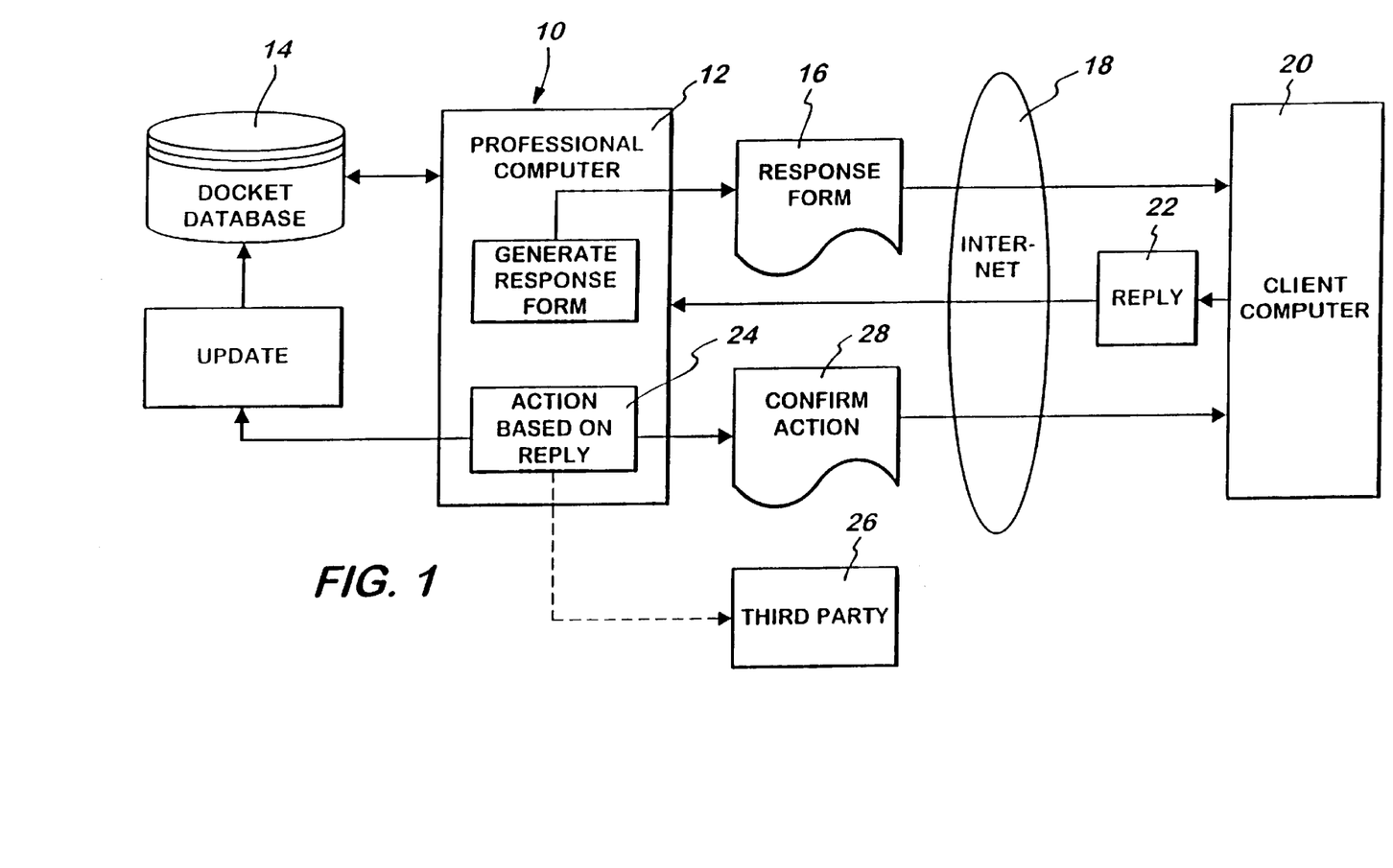
FIG. 1 is a block diagram of a device and method for automatically delivering professional services to a client in accordance with the invention.

FIG. 1 depicts a system 10 for automatically delivering professional services to a client in accordance with the invention. Software executing on a professional computer 12 automatically queries a docket database 14 by date to retrieve a client reminder (not shown). The docket database 14 is queried to retrieve client reminders on a periodic basis, e.g., daily, bi-weekly, weekly, etc. The client reminders contain information pertinent to the upcoming professional service to be rendered, such as the client name, the client e-mail address, the type of service to be rendered, the deadline for the service to be rendered, the individual professional responsible for the client, the name of the client contact person, and others.

Software executing on the professional computer 12 automatically generates a form 16 based on the retrieved client reminder and automatically transfers the form 16 through an Internet communication link 18 to a client computer 20. The form 16 contains pertinent information contained in the client reminder as well as the client's options regarding the professional service to be performed. Such options, for example, may include choices for alternative professional services or simply whether or not the client authorizes a professional service. Software executing on the client computer 20 receives the response form 16, allows the client to choose a desired option, automatically generates a reply 22 based on the client's response, and automatically transfers the reply 22 through the Internet communication link 18 to the professional computer 12.

Preferably, software executing on the professional computer 12 automatically receives the reply 22 and performs some action based on the reply 24 involving a third party 26. The type of action based on the reply 24 depends on the reply 22, and may include such actions as generating a notice of the client's choice of an option and transferring the notice to the individual professional responsible for the client, generating a transfer of funds authorization and transferring the authorization to a bank, government agency, etc., or generating a document requiring execution by the client or professional. Note that the above examples of actions based on the reply 24 and examples of third parties 26 are for illustration only and it is understood that numerous other actions and third parties are within contemplation of the present invention. Also note that the action based on the reply 24 and the means of transmitting the result of those actions to a third party 26, if necessary, may vary (illustrated in FIG. 1 by a dashed line). Examples of such transmission means include, but are not limited to, the Internet communication link 18, a telefax, a direct modem link, U.S. mail, internal communications over a computer network, and others.

Preferably, software executing on the professional computer 12 automatically updates the docket database 14 based on the client's reply 22. Also, preferably software executing on the professional computer 12 automatically generates a confirmation 28 based on the reply 22 and automatically transmits the confirmation 28 through the Internet communication link 18 to the client computer 20.

Figure 2:
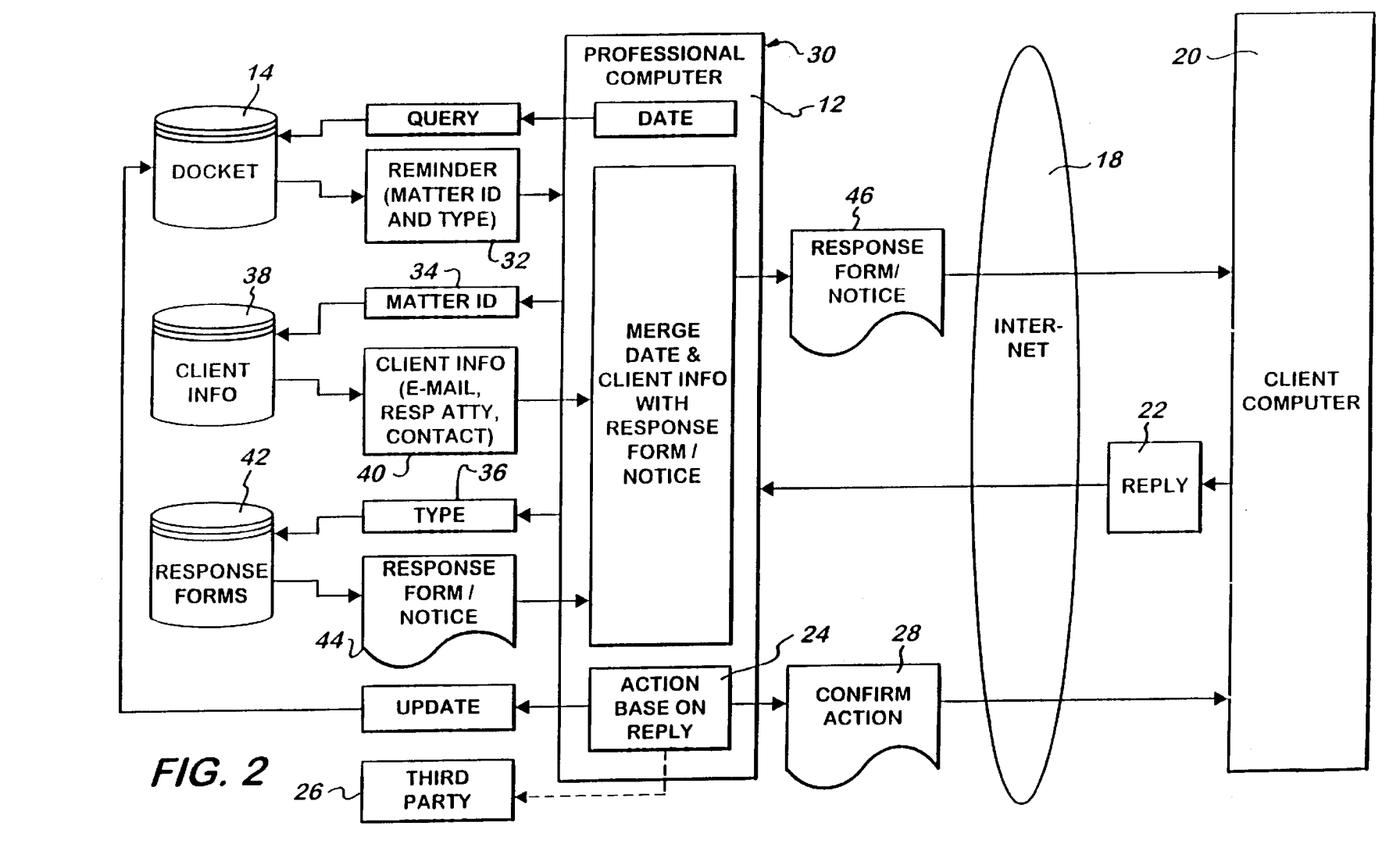
FIG. 2 is a block diagram of one specific embodiment of the device and method for automatically delivering professional services to a client of FIG. 1.

Referring to FIG. 2, a specific embodiment 30 of the system 10 for automatically delivering professional services to a client is shown. Software executing on a professional computer 12 automatically queries docket database 14 by date to retrieve a client reminder 32. The docket database 14 is queried to retrieve client reminders 32 on a periodic basis, e.g., daily, bi-weekly, weekly, etc. The client reminders 32 contain a matter identification number 34 and a type of reminder identification 36, which identifies the type of professional service to which the reminder pertains. Software executing on the professional computer 12 automatically queries a client information database 38 by the matter identification number 34 to retrieve client information 40. The client information 40 contains the client name, the individual professional responsible for the client, the client e-mail address, the name of the client contact person, and the like. Software executing on the professional computer 12 automatically queries a response forms database 42 by the type of reminder identification 36 to retrieve a response form/client notice 44. The response forms database 42 contains a plurality of response forms/client notices 44, which have been previously created and stored, and which are appropriate for different types of professional services to be performed.

Software executing on the professional computer 12 automatically merges the date and the client information 40 with the form/notice 44, and automatically transmits the merged form/notice 46 by email through an Internet communication link 18 to a client computer 20. The merged form/notice 46 contains the client's options regarding the professional services to be performed. Such options, for example, may include choices for alternative professional services or simply whether or not the client authorizes a professional service. Client computer 20 receives the merged form/notice 44, allows a client to choose a desired option, and generate a reply email 22 based on the client's response, through the Internet communication link 18 to the professional computer 12.

Preferably, software executing on the professional computer 12 automatically receives the reply email 22 and performs some action based on the reply 24 involving a third party 26. The type of action based on the reply 24 depends on the reply 22, and may include such actions as generating a notice of the client's choice of an option and transferring the notice to the individual professional responsible for the client, generating a transfer of funds authorization and transferring the authorization to a bank, government agency, etc., or generating a document requiring execution by the client and transferring the document to the client. Note that the above examples of actions based on the reply 24 and examples of third parties 26 are for illustration only and it is understood that numerous other actions and third parties are within contemplation of the present invention. Also note that the action based on the reply 24 and the means of transmitting the result of those actions to a third party 26, if necessary, may vary (illustrated in FIG. 2 by a dashed line). Examples of such transmission means include, but are not limited to, the Internet communication link 18, a telefax, a direct modem link, U.S. mail, internal communications over a computer network, etc.

Preferably, software executing on the professional computer 12 automatically updates the docket database 14' based on the client's reply 22. Also, preferably software executing on the professional computer 12 automatically generates a confirmation email 28 based on the reply 22 and automatically transmits the confirmation 28 through the Internet communication link 18 to the client computer 20.

Figure 3:
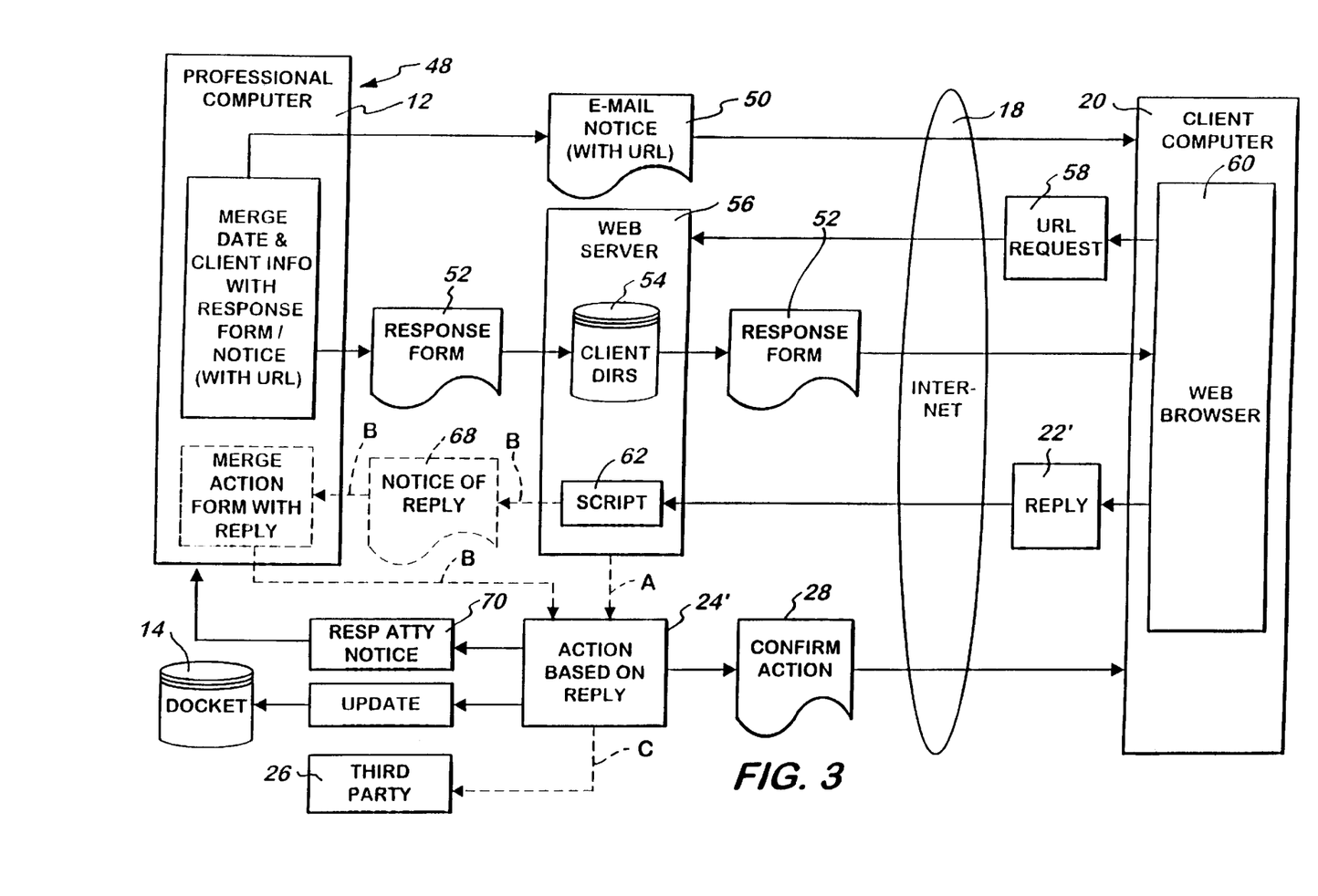
FIG. 3 is a block diagram of another embodiment of the device and method for automatically delivering professional services to a client of FIG. 1.
Figure 4:
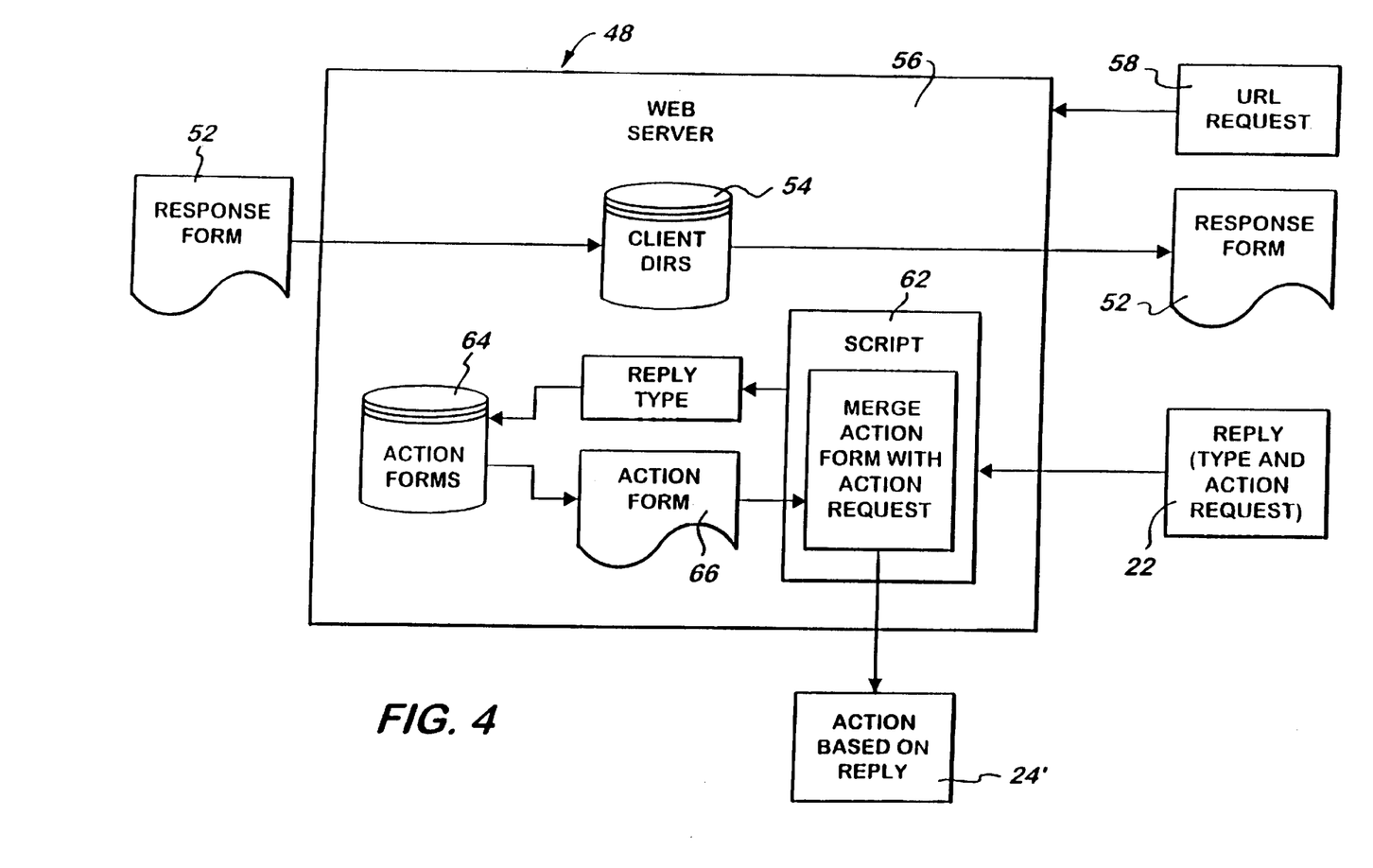
FIG. 4 is a block diagram of a portion of the device and method for automatically delivering professional services to a client of FIG. 3.
Figure 5:
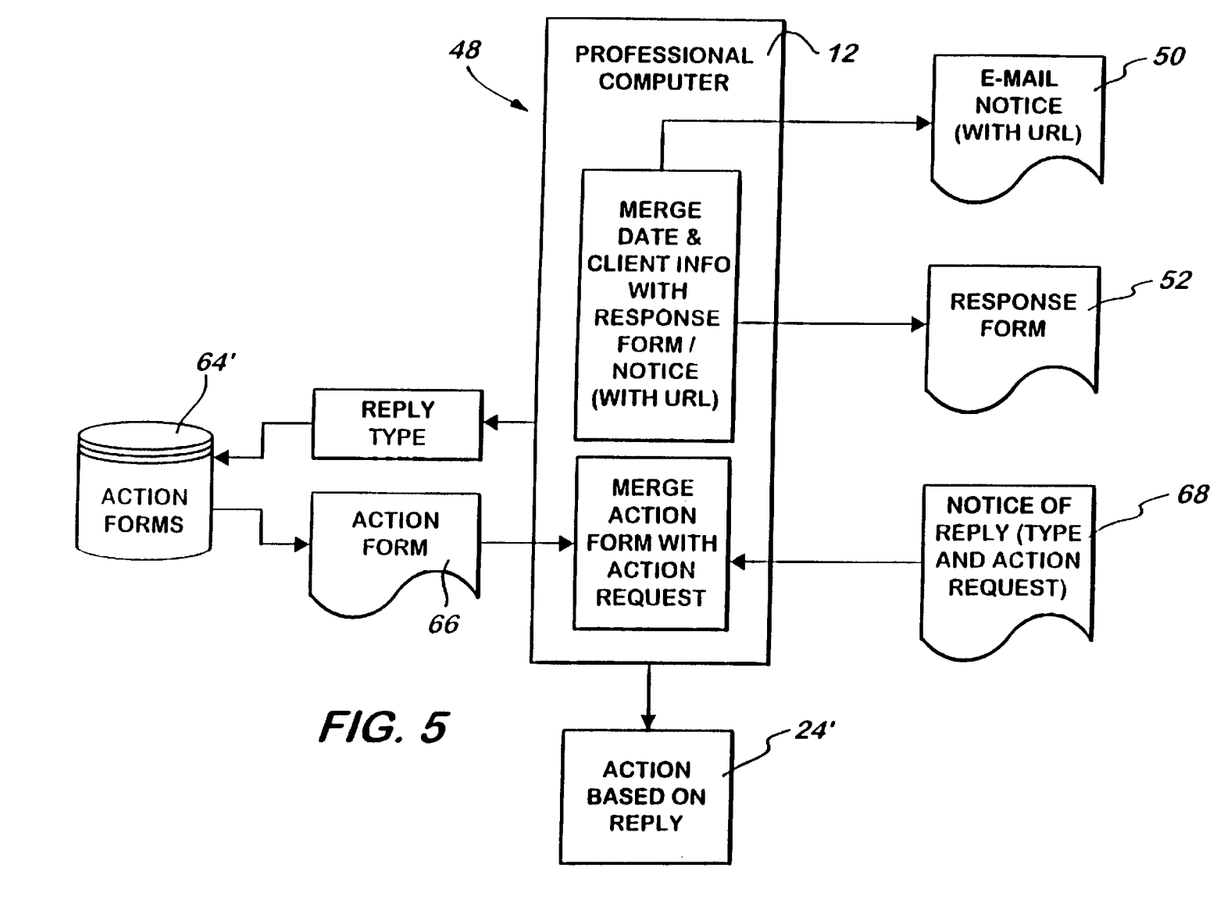
FIG. 5 is a block diagram of a portion of the device and method for automatically delivering professional services to a client of FIG. 3.

Referring to FIGS. 3–5, another embodiment 48 of the system 10 for automatically delivering professional services to a client is shown. Software executing on a professional computer 12 automatically queries docket database 14 and client information and forms databases (not shown) to retrieve client information (not shown) and a form/notice (not shown) in the identical manner as embodiment 30 shown in FIG. 2. Software executing on the professional computer 12 automatically merges the date and client information with the form/notice, automatically transmits the merged client email notice 50 through an Internet communication link 18 to a client computer 20, and automatically transmits the merged response form web page 52 to a client directory database 54 on a web server 56. The merged client email notice 50 contains a statement directed to the client that a deadline is approaching and that a response is necessary, and also contains a URL 58 which points to the response form web page 52. The merged form 52 contains the client's options regarding the professional services to be performed. Such options, for example, may include choices for alternative professional services or simply whether or not the client authorizes a professional service. The web server 56 may be a part of the firm computer 12 or may be independent, thus requiring a communication link (not shown) between the professional computer 12 and the web server 56. The client directory database 54 contains a password protected directory for each client of the professional into which the form web page 52 of each individual client is copied.

Software executing on the client computer 20 receives the merged client email notice 50, and upon the client activating the URL 58, causes a client web browser 60 to retrieve the merged response form 52 from the client directory database 54 on the professional web server 56 through the Internet communication link 18. The web browser 60 allows the client to choose a desired option, generates a reply 22' by way of a cgi script 62 running on the server or a java applet, activex control or the like running on the client computer (not shown) based on the client's response, and transmits the reply 22' through the Internet communication link 18 to the professional web server 56. The reply 22' contains an identification of the type of action to be taken and an action request, which reflects the choice made by the client. The script program 62 may either perform an action 24' based on the reply (designated by dashed line A in FIG. 3) or notify the professional computer 12 of the reply or the professional to perform an action 24' based on the reply (designated by dashed lines B in FIG. 3).

If the script program 62 is to perform the action based on the reply 24' (shown in FIG. 4), the script program 62 automatically queries an action forms database 64 on the web server 56 by type of action to be taken identification to retrieve an appropriate action form 66. The action forms database 64 contains a plurality of action forms 66 which have been previously created and stored, and which are appropriate for different types of professional services to be performed. The script program 62 automatically merges the retrieved action form 66 with the action request to produce an action 24' based on the reply involving a third party 26. If the script program 62 is to cause the professional computer 12 or professional to perform the action 24' based on the reply (shown in FIG. 5), the script program 62 automatically generates a notice of reply 68, which contains the type of action to be taken identification and the action request, and automatically transmits the notice of reply 68 to the professional computer 12. Software executing on the professional computer 12 automatically receives the notice of reply 68 and automatically queries an action forms database 64' on the professional computer 12 by type of action to be taken identification to retrieve an appropriate action form 66. The action forms database 64' contains a plurality of action forms 66 which have been previously created and stored, and which are appropriate for different types of professional services to be performed. Software executing on the professional computer 12 automatically merges the retrieved action form 66 with the action request to produce an action 24' based on the reply involving a third party 26.

Whether the action 24' based on the reply is performed by the script program 62 or by software executing on the professional computer 12, the type of action 24' based on the reply depends on the reply 22, and may include such things as generating a notice of the client's choice of an option and transferring the notice to the individual professional responsible for the client, generating a transfer of funds authorization and transferring the authorization to a bank, government agency, etc., or generating a document requiring execution by the client or professional. Note that the above examples of actions 24' based on the reply and examples of third parties 26 are for illustration only and it is understood that numerous other actions and third parties are within contemplation of the present invention. Also note that the action 24' based on the reply and the means of transmitting the result of those actions to a third party 26, if necessary, may vary (illustrated in FIG. 3 by dashed line C). Examples of such transmission means include, but are not limited to, the Internet communication link 18, a telefax, a direct modem link, U.S. mail, internal communications over a computer network, etc.

Preferably, the action 24' based on the reply includes automatically updating the docket database 14' based on the client's reply 22, and automatically generating a responsible professional notice 70 and transmitting the responsible professional notice 70 to the professional responsible for the client. Also, preferably the action 24' based on the reply includes automatically generating a confirmation email 28 based on the action 24' and automatically transmitting the confirmation 28 through the Internet communication link 18 to the client computer 20.

Figure 6:
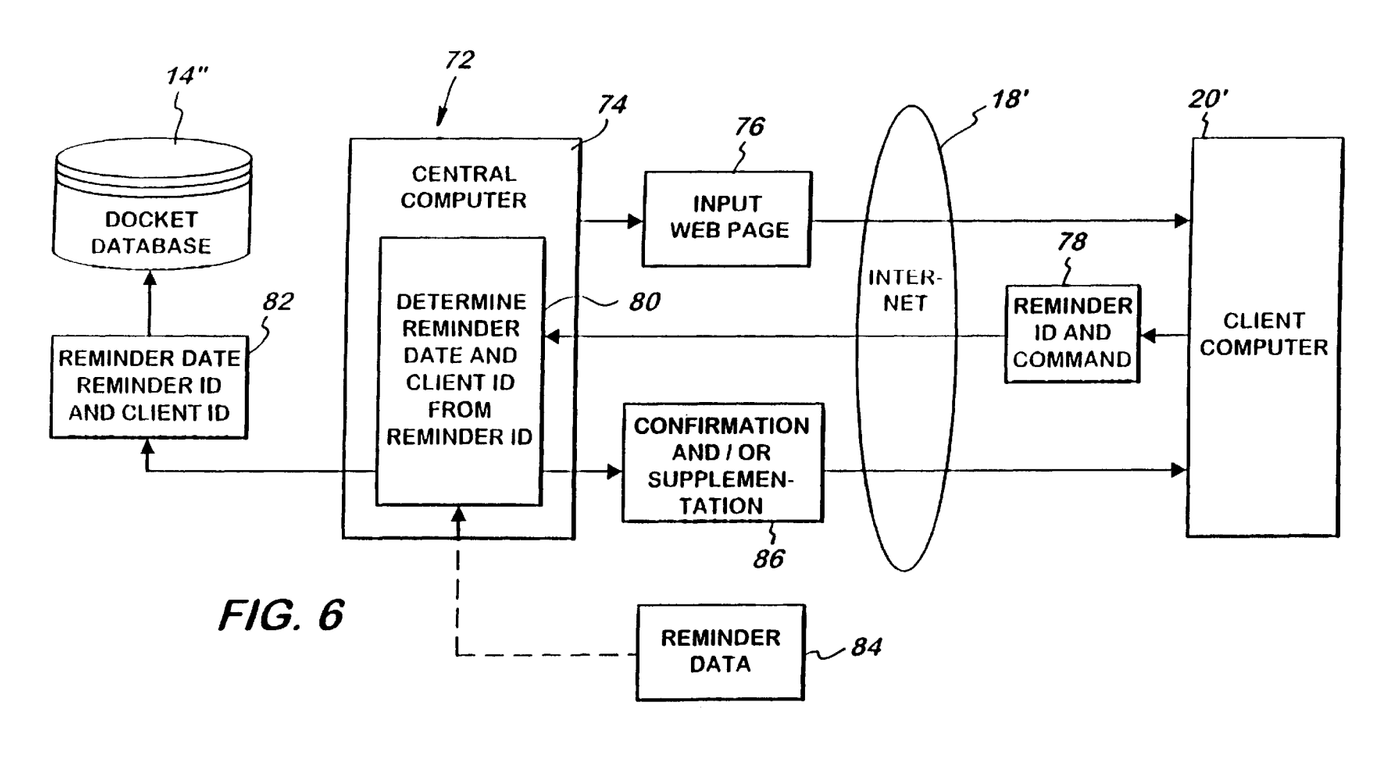
FIG. 6 is a block diagram of a web site permitting direct client entry of reminders to the automated system of FIG. 1.

Referring now to FIG. 6, a web site 72 is shown which permits direct client entry of reminders to the automated system for delivering professional services. Web site 72 includes a central computer 74 and a database 14" which is accessible by central computer 74. Software executing on central computer 74 generates an input web page 76 which can be retrieved by a client computer 20', preferably but not necessarily through the Internet 18'. The client enters a reminder identifier, a command for management of the reminder, and if desired, a request to perform a professional service, and then transfers this information 78 back to central computer 74, again preferably through the Internet 18'. The reminder identifier is indicative of a particular matter for which the professional is responsible. For example, in the case of an intellectual property attorney, the reminder identifier may include an intellectual property identifier, which may be a patent number or a trademark number. The command for management of the reminder may be, for example, a command to add data to the reminder, delete data in the reminder, or modify data in the reminder. The request to perform a professional service may include, in the intellectual property attorney example, a request for payment of an annuity or maintenance fee, or a request to file an intellectual property application.

The information 78 supplied by the client is received by central computer 74, which has software 80 executing thereon for determining a reminder date and client identifier from the reminder identifier. The reminder date, reminder identifier and client identifier are then stored (indicated as 82) on docket database 14", thereby adding to, deleting from, or modifying the existing reminders stored on database 14". Preferably, web site 72 includes a data source 84 which is used by software 80 to supplement and confirm the reminder identifier entered by the client before updating docket database 14". Data source 84 may include, for example, a source of intellectual property data, including such data as the filing date and/or registration date of the intellectual property identifier, for confirming and/or supplementing the intellectual property identifier. Data source 84 may also include information such as the cost of the professional service requested. Preferably, software 80 generates a message 86 confirming and/or supplementing the reminder identifier entered by the client and transmits message 86 to client computer 20' through the Internet 18'.

Figure 7:
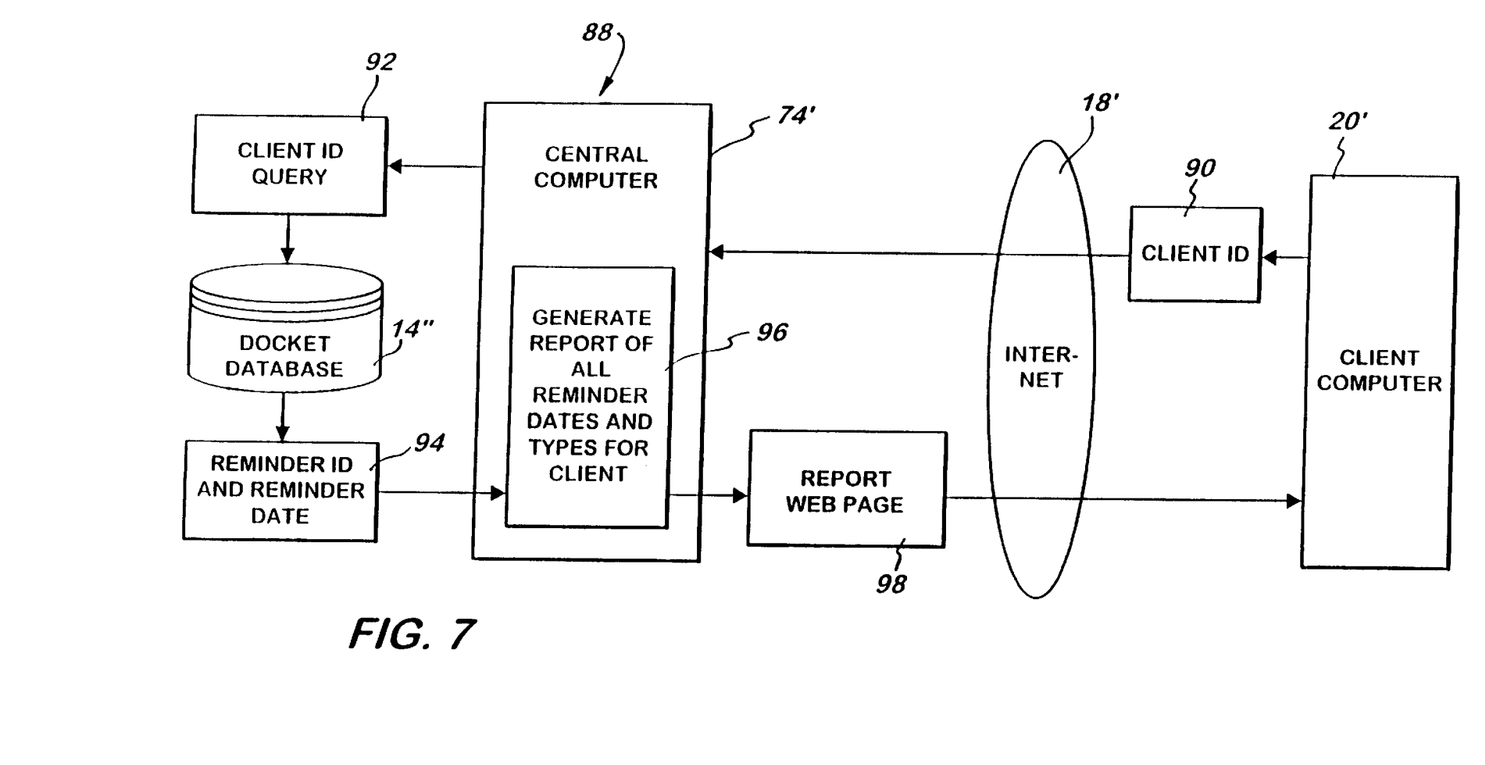
FIG. 7 is a block diagram of a web site enabling direct client reporting of reminders on the automated system of FIG. 1

Referring now to FIG. 7, a web site 88 is shown which enables direct client reporting of reminders on the automated system for delivering professional services. A client identifier 90 is entered by a client and transferred from client computer 20' to central computer 74' preferably, but not necessarily, through the Internet 18' Central computer 74' uses client identifier 90 to query (shown as 92) docket database 14", which returns to central computer 74' all reminder identifiers and reminder dates 94 associated with client identifier 90. Software 96 executing on central computer 74' generates a report of all reminder dates and reminder types returned by database 14", generates a report web page 98, and transfers report web page 98 to client computer 20' preferably through the Internet 18'. The report generated by software 96 may be organized by client identifier only, or may be organized by client identifier and then by client reference if such a client reference is sent at 90 with client identifier.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A device for automatically delivering professional services to a client comprising:

a computer;

a database containing a plurality of client reminders, each of the client reminders comprising a date field having a value attributed thereto;

software executing on said computer for automatically querying said database by the values attributed to each client reminder date field to retrieve a client reminder;

software executing on said computer for automatically generating a form based on the retrieved client reminder;

a communication link between said computer and the Internet; and software executing on said computer for automatically transmitting the form through said communication link.

2. The device of claim 1 wherein the form is an email message.

3. The device of claim 2 wherein the form is a web page.

4. A device for automatically delivering professional services comprising:

a computer;

a docket database containing a plurality of client reminders, each client reminder including a matter identification number and a type of reminder identification, each of the client reminders also comprising a date field having a value attributed thereto;

software executing on said computer for automatically querying said database by the values attributed to each client reminder date field to retrieve a client reminder;

a client information database containing a plurality of client information;

software executing on said computer for automatically querying said client information database by the matter identification number to retrieve client information;

a forms database containing a plurality of forms;

software executing on said computer for automatically querying said forms database by the type of reminder identification to retrieve a form;

software executing on said computer for automatically merging the date and the client information with the form;

a communication link between said computer and the Internet; and software executing on said computer for automatically transmitting the form through said communication link.

5. The device of claim 4 where in the form is an email message.

6. The device of claim 4 wherein the form is a web page.

7. A device for automatically delivering professional services comprising:

a computer;

a database containing a plurality of client reminders each of the client reminders comprising a date field having a value attributed thereto;

software executing on said computer for automatically querying said database by the values attributed to each client reminder date field to retrieve a client reminder;

software executing on said computer for automatically generating a form and a notice based on the retrieved client reminder, the notice containing a URL;

a web server;

software executing on said computer for automatically transmitting the form to said web server and for automatically transmitting the notice; and, software executing on said web server for automatically transmitting the form when the URL is activated.

8. The device of claim 7 when the notice is an email message.

9. A method for automatically delivering professional services comprising the steps of:

providing a computer;

providing a database containing a plurality of client reminders, each of the client reminders including a date field having a value attributed thereto;

querying said database by the values attributed to each client reminder date field to retrieve a client reminder;

generating a form from the retrieved client reminder;

establishing a communication link between said computer and the Internet; and transmitting said form through said communication link.

10. The method of claim 9 where in the generating step further comprises generating an email message.

11. The method of claim 9 wherein the generating step further comprises generating a web page.

* * * * *